(12) United States Patent
Nakamoto et al.

(10) Patent No.: US 11,014,232 B2
(45) Date of Patent: May 25, 2021

(54) HOLDING APPARATUS, ARTICLE HANDLING APPARATUS, AND CONTROL APPARATUS

(71) Applicant: KABUSHIKI KAISHA TOSHIBA, Minato-ku (JP)

(72) Inventors: Hideichi Nakamoto, Tokyo (JP); Atsushi Sugahara, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/799,993

(22) Filed: Feb. 25, 2020

(65) Prior Publication Data

US 2021/0069902 A1    Mar. 11, 2021

(30) Foreign Application Priority Data

Sep. 6, 2019   (JP) .............................. JP2019-163107

(51) Int. Cl.
 *B25J 9/16*  (2006.01)
 *B25J 15/00* (2006.01)

(52) U.S. Cl.
 CPC ........... *B25J 9/1612* (2013.01); *B25J 9/1694* (2013.01); *B25J 15/0004* (2013.01); *B25J 15/0014* (2013.01); *B25J 15/0028* (2013.01)

(58) Field of Classification Search
 None
 See application file for complete search history.

(56) References Cited

U.S. PATENT DOCUMENTS

| | | | |
|---|---|---|---|
| 9,650,215 B2 * | 5/2017 | Girtman | ................... B25J 11/00 |
| 2010/0262286 A1 * | 10/2010 | Eidenberger | ........... G06N 20/00 700/246 |
| 2016/0137435 A1 * | 5/2016 | Tanaka | ..................... B25J 9/023 414/564 |
| 2016/0207195 A1 | 7/2016 | Eto et al. | |
| 2017/0137236 A1 | 5/2017 | Sonoura et al. | |
| 2018/0079082 A1 | 3/2018 | Takahashi et al. | |
| 2018/0215540 A1 * | 8/2018 | Tanaka | ................. B25J 19/0004 |

FOREIGN PATENT DOCUMENTS

| | | |
|---|---|---|
| EP | 3 020 515 A1 | 5/2016 |
| EP | 3 623 324 A1 | 3/2020 |
| JP | 07-069455 A | 3/1995 |
| WO | WO 2017/181337 A1 | 10/2017 |

* cited by examiner

*Primary Examiner* — Gerald McClain
(74) *Attorney, Agent, or Firm* — Oblon, McClelland, Maier & Neustadt, L.L.P.

(57) ABSTRACT

According to one embodiment, a holding apparatus includes a holding part, a rotating part, a supporting part, and a moving mechanism. The holding part is configured to hold an article. The rotating part is configured to rotate the holding part. The supporting part is configured to support the article from below. The moving mechanism is configured to move the holding part with respect to the supporting part.

12 Claims, 9 Drawing Sheets

HOLDING APPARATUS, ARTICLE HANDLING APPARATUS, AND CONTROL APPARATUS

CROSS-REFERENCE TO RELATED APPLICATIONS

This application is based upon and claims the benefit of priority from Japanese Patent Application No. 2019-163107, filed Sep. 6, 2019, the entire contents of which are incorporated herein by reference.

FIELD

Embodiments described herein relate generally to a holding apparatus, an article handling apparatus, and a control apparatus.

BACKGROUND

A depalletizing machine intended for logistics suctions and holds articles placed on a palette one by one, and moves them to a target location (e.g., a belt conveyor). For an article handling apparatus such as a depalletizing machine intended for logistics, there is a demand for handling articles that cannot be held only by suction, such as extremely heavy articles or articles wrapped in paper.

DETAILED DESCRIPTION

According to one embodiment, a holding apparatus includes a holding part, a rotating part, a supporting part, and a moving mechanism. The holding part is configured to hold an article. The rotating part is configured to rotate the holding part. The supporting part is configured to support the article from below. The moving mechanism is configured to move the holding part with respect to the supporting part.

Hereinafter, embodiments will be described with reference to the accompanying drawings.

Figure 1:
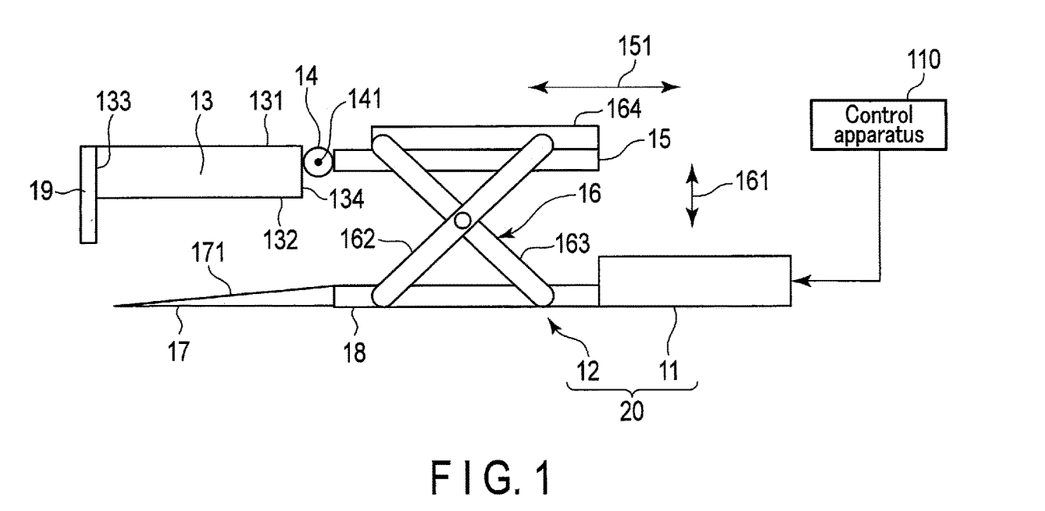
FIG. 1 is a schematic diagram illustrating an article handling apparatus according to an embodiment.

FIG. 1 is a side view schematically illustrating an article handling system 10 according to an embodiment. As illustrated in FIG. 1, the article handling system 10 includes an article handling apparatus 20 and a control apparatus 110. The control apparatus 110 controls the article handling apparatus 20. The control apparatus 110 will be described later in detail. In the example of FIG. 1, the control apparatus 110 is separated from the article handling apparatus 20. The control apparatus 110 may be a part of the article handling apparatus 20.

The article handling apparatus 20 includes an arm part 11, and a hand part 12 which is also referred to as a hand or a holding apparatus. The arm part 11 is connected to the hand part 12 and moves the hand part 12. The arm part 11 may have any structure. Thus, a description of the arm part 11 is omitted.

The hand part 12 includes a holding part 13, a rotating part 14, a moving part 15, a moving part 16, a supporting part 17, a base part 18, and a scraping-out part 19. The holding part 13 is connected to the rotating part 14, the rotating part 14 is connected to the moving part 15, the moving part 15 is connected to the moving part 16, the moving part 16 is connected to the base part 18, the supporting part 17 is connected to the base part 18, and the base part 18 is connected to the arm part 11. The scraping-out part 19 is connected to the holding part 13. In another embodiment, the scraping-out part 19 may be omitted.

The holding part 13 suctions and holds the article. For example, the holding part 13 includes a base member 131 having a rectangular parallelepiped shape, one or more suction pads (not shown) on one surface 132 of the base member 131, and vacuum pumps (not shown) connected to the suction pads; the suction pads hold the article under suction by the vacuum pumps. Hereinafter, the surface provided with the suction pads will be referred to as a holding surface or a suction surface.

The rotating part 14 rotates the holding part 13 about a rotational axis 141. The rotational axis 141 may be parallel to the holding surface 132 of the holding part 13. For example, the rotating part 14 includes a rotary joint, and an electronic motor for rotating the rotary joint. The rotating part 14 changes a posture of the holding part 13 between a first posture and a second posture. The holding surface 132 of the first posture is approximately orthogonal to the holding surface 132 of the second posture. In the first posture, the holding surface 132 of the holding part 13 faces downward, while in the second posture, the holding surface 132 of the holding part 13 faces laterally (in a horizontal direction). The holding part 13, when rotated 90 degrees, changes its posture from the first posture to the second posture, and when rotated in the opposite direction 90 degrees, changes the posture from the second posture to the first posture.

The moving part 15 moves the holding part 13 and the rotating part 14 in a linear direction 151, specifically in a front-back direction. The direction 151 may be vertical to the rotational axis 141. For example, the moving part 15 is configured to be elongated and shortened. When the moving part 15 is elongated, the holding part 13 moves forward. When the moving part 15 is shortened, the holding part 13 moves backward. For example, the moving part 15 includes a static part including a rail, a slider, and an electronic motor. The rotating part 14 is fixed to the end of the slider, and the static part is fixed to the moving part 16. The slider is driven by the electronic motor, and slides along the rail of the static part. The sliding of the slider enables the moving part 15 to be elongated or shortened.

The moving part 16 moves the holding part 13, the rotating part 14, and the moving part 15 in a linear direction 161, specifically, in a vertical direction. The direction 161 may be vertical to the rotational axis 141 and the direction 151. For example, the moving part 16 is configured to be elongated and shortened. When the moving part 16 is elongated, the holding part 13 moves upward. When the moving part 16 is shortened, the holding part 13 moves downward. For example, the moving part 16 includes members 162, 163 and 164, a static part, and an electronic motor. The static part is fixed to the base part 18, and the moving part 15 is fixed to the member 164. The member 164 and the static part include a rail. The members 162 and 163 are crossed. The member 162 includes a first end fixed to the static part, and a second end connected to the member 164 to be slidable along the rail of the member 164. The member 163 includes a first end connected to the static part to be slidable along the rail of the static part, and a second end fixed to the member 164. The first end of the member 163 is driven by the electronic motor, and slides along the rail of the static part. The sliding of the first end of the member 163 enables the moving part 16 to be elongated or shortened.

The above-described moving parts 15 and 16 are an example of the moving mechanism that moves the holding part 13 and the rotating part 14 with respect to the supporting part 17 and the base part 18. Typically, the moving mechanism moves, to the supporting part 17 and the base part 18, the holding part 13 and the rotating part 14 in two directions crossing the rotational axis 141 of the rotating part 14.

The supporting part 17 supports the article from below. The article is placed on a surface 171 of the supporting part 17, and the surface 171 faces the holding part 13. The supporting part 17 is fixed to the base part 18. When the holding part 13 adopts the first posture, the surface 171 of the supporting part 17 faces the holding surface 132 of the holding part 13.

The scraping-out part 19 is provided at a distal end part 133 of the holding part 13. The distal end part 133 of the holding part 13 is an end on a side opposite to a proximal end part 134 connected to the rotating part 14. The scraping-out part 19 can project with respect to the holding surface 132. FIG. 1 illustrates a state in which the scraping-out part 19 projects outside the holding surface 132 of the holding part 13. The scraping-out part 19 is stored inside the holding surface 132 of the holding part 13 when not used.

The article handling apparatus 20 supports three operation modes, i.e., an upper surface suction mode, a side surface suction mode, and a scrape-out mode. In the upper surface suction mode, the holding part 13 suctions and holds the upper surface of the article. In the side surface suction mode, the holding part 13 suctions and holds the side surface of the article. In the scrape-out mode, the scraping-out part 19 scrapes out the article onto the supporting part 17. In the upper surface suction mode or the scrape-out mode, the holding part 13 is set to adopt the first posture. In the side surface suction mode, the holding part 13 is set to adopt the second posture.

Figure 2:
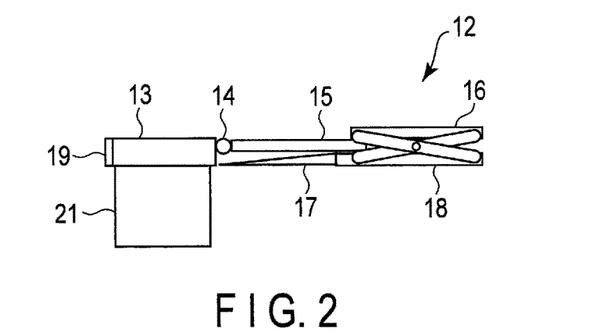
FIG. 2 is a side view illustrating an upper surface suction mode of the article handling apparatus illustrated in FIG. 1.

With reference to FIG. 2, the upper surface suction mode will be described. As shown in FIG. 2, in the upper surface suction mode, the holding part 13 is located in front of the distal end of the supporting part 17, and the holding surface of the holding part 13 faces downward. Typically, the moving part 16 is shortened. In this state, the arm part 11 moves the holding part 13 so that the holding part 13 is brought into contact with an upper surface of an article 21, and the holding part 13 suctions and holds the upper surface of the article 21. The arm part 11 moves the hand part 12 with the holding part 13 holding the article 21, in order to move the article 21 to a target position.

Figure 3A:
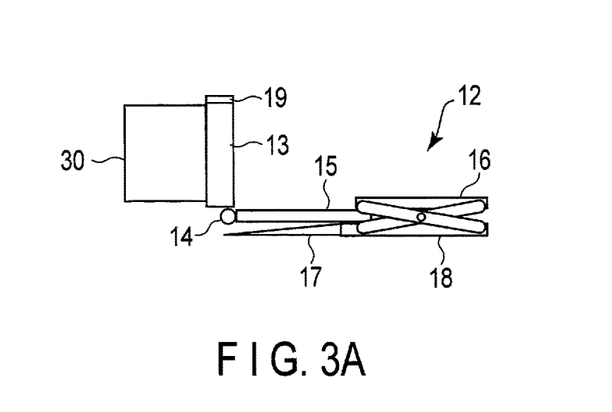
FIGS. 3A and 3B are side views illustrating a side surface suction mode of the article handling apparatus illustrated in FIG. 1.

With reference to FIGS. 3A and 3B, the side surface suction mode will be described. As shown in FIG. 3A, in the side surface suction mode, the holding part 13 is located in front of the distal end of the supporting part 17, and the holding surface of the holding part 13 faces laterally. Typically, the moving part 16 is shortened. In this state, the arm part 11 moves the holding part 13 so that the holding part 13 is brought into contact with a side surface (front face) of the article 30, and the holding part 13 suctions and holds the side surface of the article 30. The arm part 11 moves the hand part 12 with the holding part 13 holding the article 30, in order to move the article 30 to a target position.

Figure 3B:
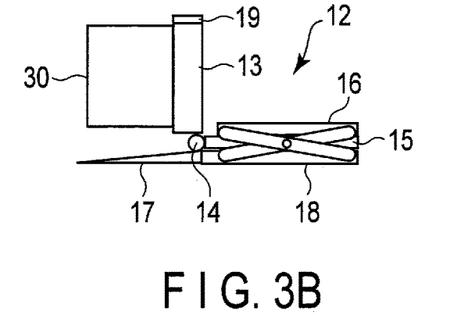

As illustrated in FIG. 3B, in the hand part 12, the holding part 13 may be moved backward by the moving part 15 to place the article 30 on the supporting part 17. At this time, in the hand part 12, the holding part 13 may be moved backward by the moving part 15 while slightly lifted up by the moving part 16. In this case, the friction between the article being held and the article therebelow can be reduced. The arm part 11 moves the hand part 12 with the article 30 placed on the supporting part 17 in order to move the article 30 to a target position.

Figure 4A:
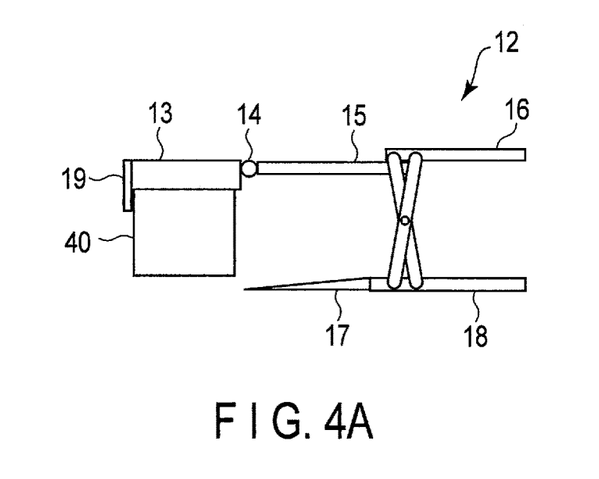
FIGS. 4A and 4B are side views illustrating a scrape-out mode of the article handling apparatus illustrated in FIG. 1.
Figure 4B:
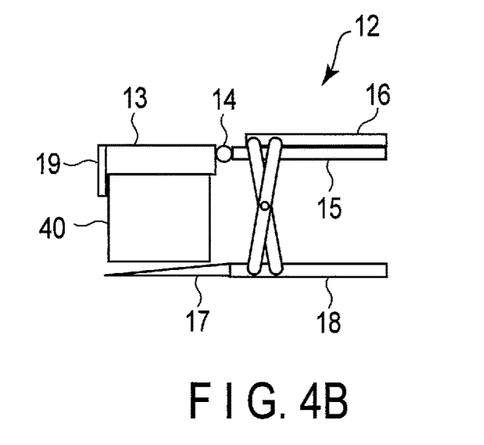

With reference to FIGS. 4A and 4B, the scrape-out mode will be described. As shown in FIG. 4A, in the scrape-out mode, the holding part 13 is located in front of the distal end of the supporting part 17, the holding surface of the holding part 13 faces downward, the moving part 16 is elongated, and the scraping-out part 19 projects. In this state, the arm part 11 moves the hand part 12 to place the scraping-out part 19 on the back surface of the article 40. Then, as illustrated in FIG. 4B, in the arm part 11, the holding part 13 is moved backward by the moving part 15 to scrape out the article 40 on the supporting part 17.

Figure 5A:
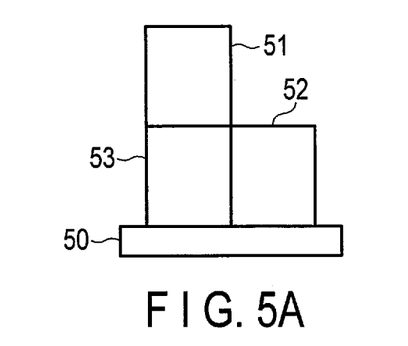
FIGS. 5A, 5B and 5C are side views illustrating examples of a stacked state of articles.
Figure 5B:
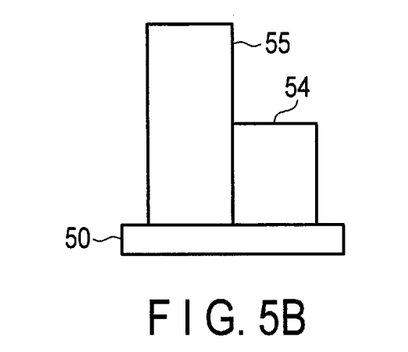
Figure 5C:
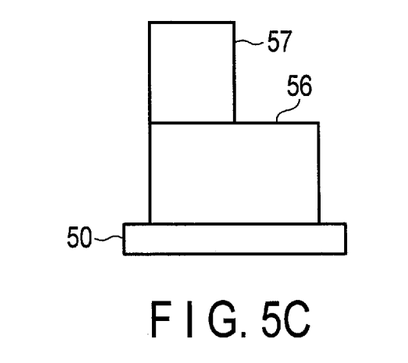

FIGS. 5A, 5B and 5C each show a side view schematically illustrating an example of a loading state of articles. In FIGS. 5A, 5B and 5C, the article handling apparatus 20 is not illustrated but assumed to be located on the right side.

In the example of FIG. 5A, there are articles 51, 52 and 53 of the same shape, in which the articles 52 and 53 are aligned on a container 50 and the article 51 is placed on the article 53. Each of the articles 51 and 52 can be taken out in both the upper surface suction mode and the side surface suction mode.

In the example of FIG. 5B, an article 54 and an article 55 of the higher height are aligned on the container 50. The article 54 can be taken out in both the upper surface suction mode and the side surface suction mode. On the other hand, if the article handling apparatus 20 takes out the article 55 in the side surface suction mode, the article 54 is moved in association with the movement of the article 55 by the article handling apparatus 20, and the article 54 falls from the container 50. Thus, the article 55 can be taken out in the upper surface suction mode, but cannot be taken out in the side surface suction mode.

In the example of FIG. 5C, an article 56 is placed on the container 50, and an article 57 is placed on the article 56. The article 57 can be taken out in both the upper surface suction mode and the side surface suction mode. On the other hand, if the article handling apparatus 20 takes out the article 56, the article 57 may fall from the article 56. Thus, the article 56 can be taken out neither in the upper surface suction mode nor the side surface suction mode.

The article handling system 10 recognizes the state of articles stacked in an area such as a container or a palette via use of a sensor such as a camera, but cannot identify a stacking pattern as illustrated in FIGS. 5A, 5B and 5C. Therefore, simply extracting articles may cause a collapse of the article stack. Thus, the article handling system 10 identifies a stacking pattern during taking-out of the articles.

With reference to FIGS. 6 through 9, a description will be given of processes relating to the prevention of a collapse of the article stack while the article handling system 10 extracts articles.

Figure 6:
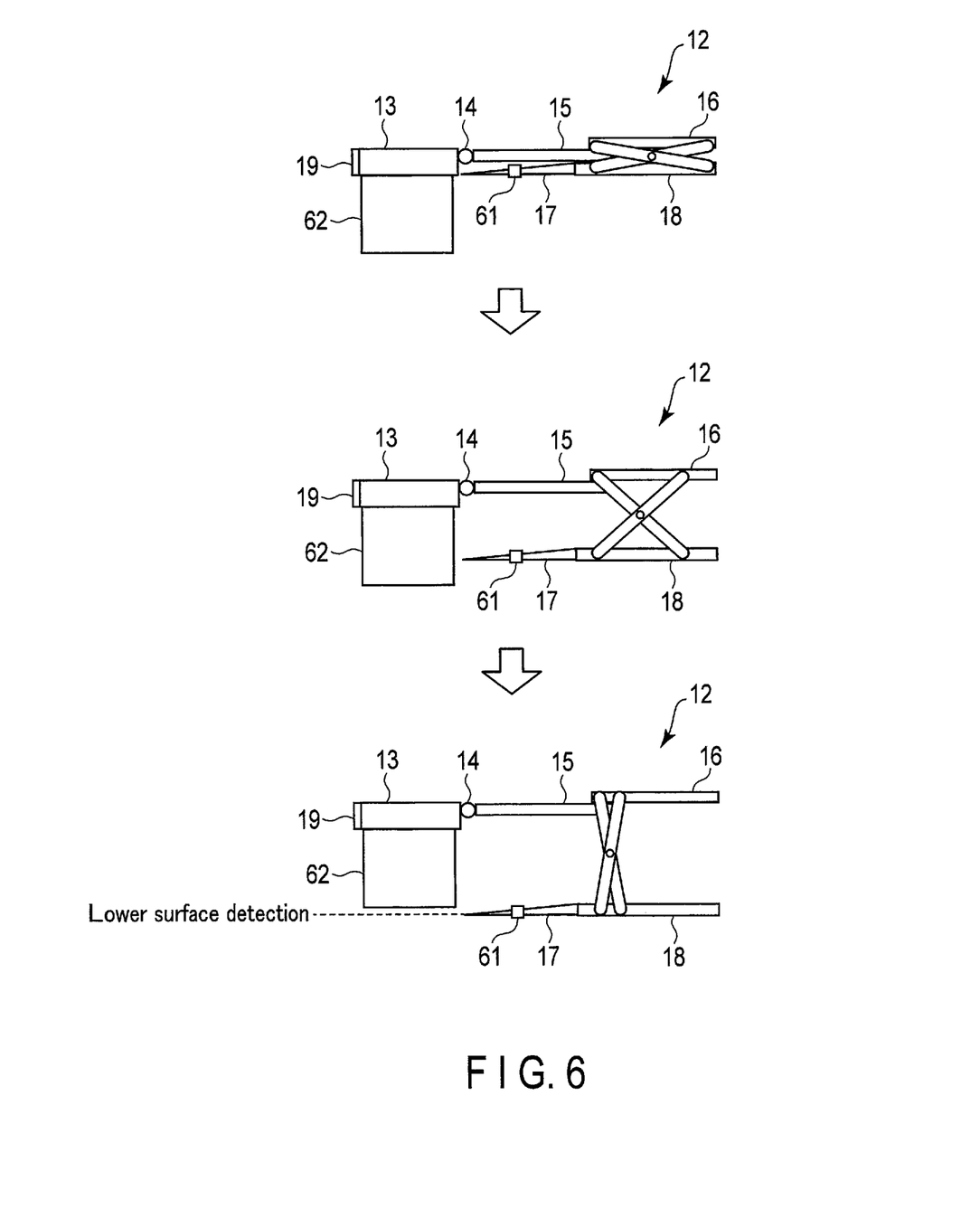
FIG. 6 is a side view illustrating an article lower surface detection process in the upper surface suction mode of the article handling apparatus illustrated in FIG. 1.
Figure 7:
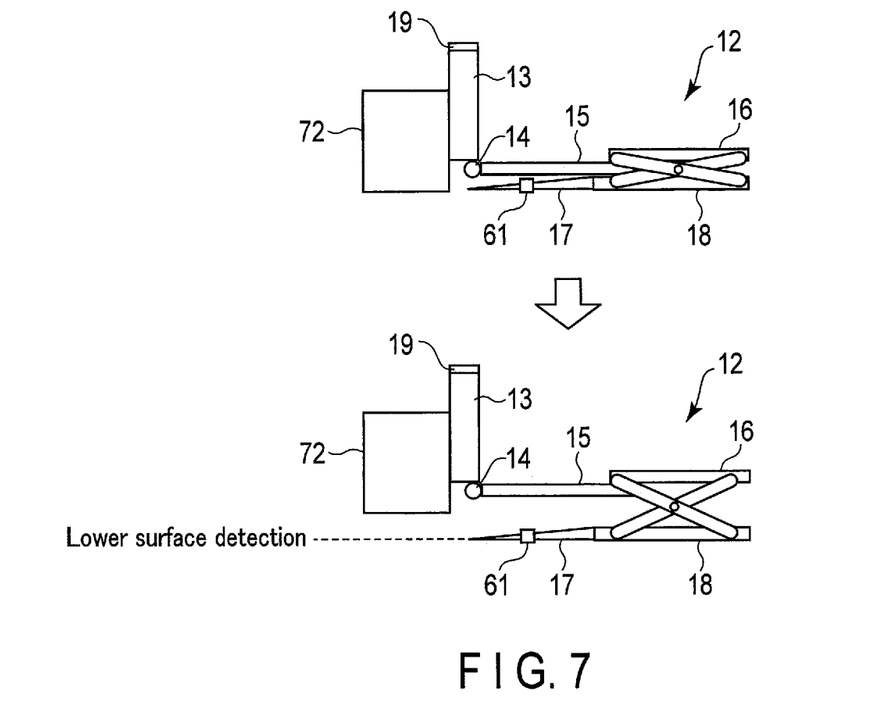
FIG. 7 is a side view illustrating an article lower surface detection process in the side surface suction mode of the article handling apparatus illustrated in FIG. 1.

FIG. 6 illustrates an article lower surface detection process carried out when the article handling system 10 takes out articles in the upper surface suction mode, and FIG. 7 illustrates an article lower surface detection process carried out when the article handling system 10 takes out articles in the side surface suction mode. The control apparatus 110 in the article handling system 10 may include an article lower surface detector that detects a lower surface of an article held by the holding part 13. The article lower surface detector detects the lower surface of the article lifted by the holding part 13 based on sensor data output from a ranging sensor 61 shown in FIG. 6. The ranging sensor 61 measures a distance to a target object. Instead of or in addition to the ranging sensor 61, another sensor such as a depth camera may be used. The ranging sensor 61 is arranged in the supporting part 17. The ranging sensor 61 may be attached to another portion such as the base part 18.

The article handling system 10 lifts up the article 62 by elongating the moving part 16 after suctioning and holding the article 62. At this time, the article lower surface detector monitors the measurement value of the distance obtained by the ranging sensor 61. The article lower surface detector determines that the lower surface of the article 62 is detected when the distance measurement value changed to a larger value.

As illustrated in FIG. 7, in the side surface suction mode, the article handling system 10 lifts up the article 72 by elongating the moving part 16 after suctioning and holding the article 72, in a manner similar to the upper surface suction mode. The article lower surface detector determines that the lower surface of the article 72 is detected when the distance measurement value changed to a larger value.

Figure 8A:
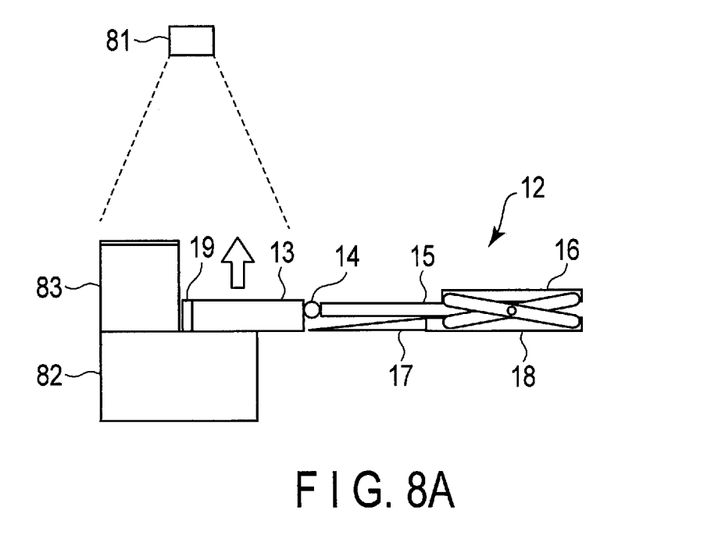
FIG. 8A is a side view illustrating an article upper surface movement detection process in the upper surface suction mode of the article handling apparatus illustrated in FIG. 1.
Figure 8B:
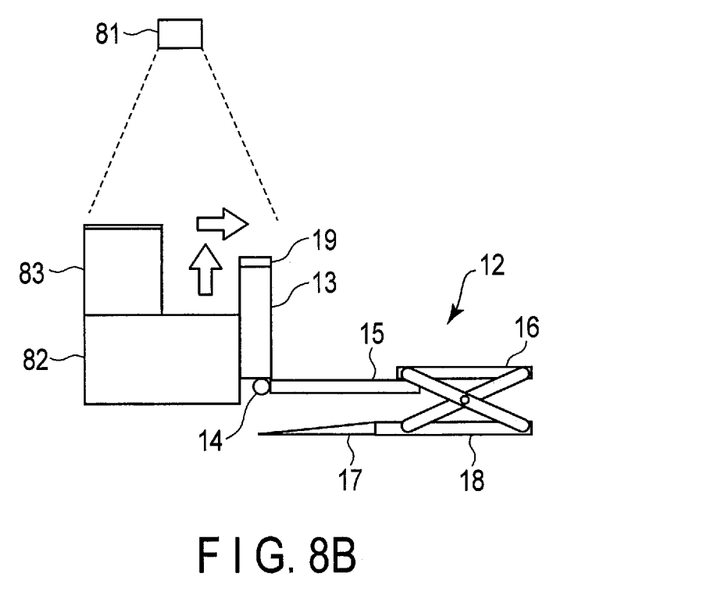
FIG. 8B is a side view illustrating an article upper surface movement detection process in the side surface suction mode of the article handling apparatus illustrated in FIG. 1.

FIG. 8A illustrates an article upper surface movement detection process carried out when the article handling system 10 takes out articles in the upper surface suction mode, and FIG. 8B illustrates an article upper surface movement detection process carried out when the article handling system 10 takes out articles in the side surface suction mode. The control apparatus 110 in the article handling system 10 may include an article upper surface movement detector (also called a first article movement detector) that detects movement of the upper surface of the article. The article upper surface movement detector detects whether another article (e.g., article 83) has been lifted up in association with the article lifted via use of the holding part 13, based on sensor data output from a sensor such as a depth camera 81 illustrated in FIG. 8A. Typically, the depth camera 81 is provided on an upper side of the container. If the article upper surface movement detector detects that another article has been lifted up together with the article 82, the article upper surface movement detector 10 returns the article 82 and changes an operation mode or a holding target.

As illustrated in FIG. 8B, in the side surface suction mode, the article handling system 10 lifts up the article 82 held by the holding part 13. The article upper surface movement detector determines whether another article (e.g., article 83) has been lifted up. After lifting up the article 82, the article handling system 10 moves the article 82 laterally (backward). At this time, the article upper surface movement detector may determine whether another article (e.g., article 83) has been moved laterally. If the article upper surface movement detector detects that another article has been lifted up or moved laterally together with the article 82, the article upper surface movement detector 10 returns the article 82 and changes the operation mode or the holding target.

Figure 9:
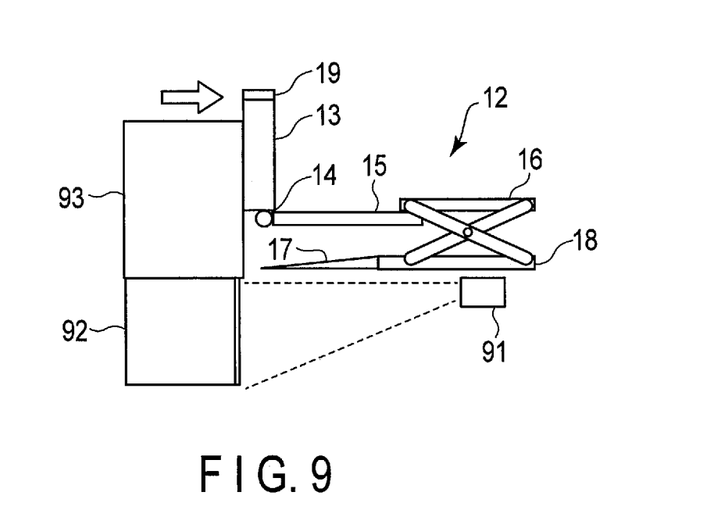
FIG. 9 is a side view illustrating an article side surface movement detection process in the side surface suction mode of the article handling apparatus illustrated in FIG. 1.

FIG. 9 illustrates an article side surface movement detection process carried out when the article handling system 10 takes out the article. The control apparatus 110 in the article handling system 10 may include an article side surface movement detector (also called a second article movement detector) that detects movement of the side surface of the article. The article upper surface movement detector detects whether another article has been moved laterally in association with the article moved laterally via using the holding part 13, based on sensor data output from a sensor such as a depth camera 91 illustrated in FIG. 9. Typically, the depth camera 91 is provided on a side of the container. The sensor may be provided on the lower surface of the base part 18. The article side surface movement detector determines, when an article 92 held is moved laterally, whether an article other than the article 92 (e.g., article 93 below the article 92) has been moved laterally. If the article side surface movement detector detects that another article has been moved laterally together with the article 92, the article handling system 10 returns the article 92 and changes the operation mode or the holding target.

Figure 10:
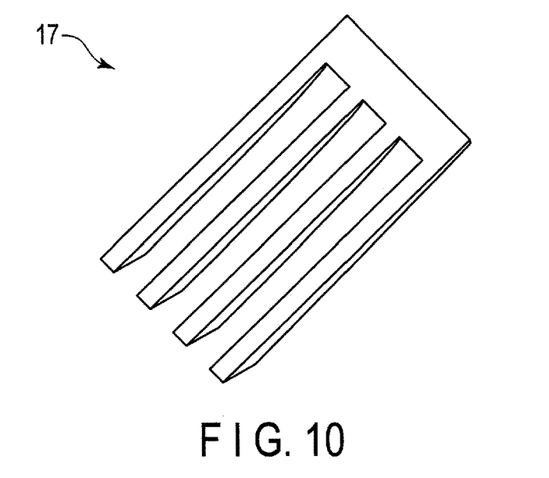
FIG. 10 is a perspective view illustrating an example of a structure of a supporting part illustrated in FIG. 1.

FIG. 10 schematically illustrates an example of a structure of the supporting part 17. In the example of FIG. 10, the supporting part 17 has a comb shape in which rod members are arranged at a prescribed interval. The supporting part 17 having this structure is suitable to lift down the article from the supporting part 17 to a roller conveyor. The interval between the rod members is set to be wider than the width of the roller included in the roller conveyor, and the rod member has a width narrower than the interval between rollers. The arm part 11 moves down the supporting part 17 so that the rod member is inserted between the rollers. This makes it possible to move the article quickly from the supporting part 17 to the roller conveyor.

Figure 11:
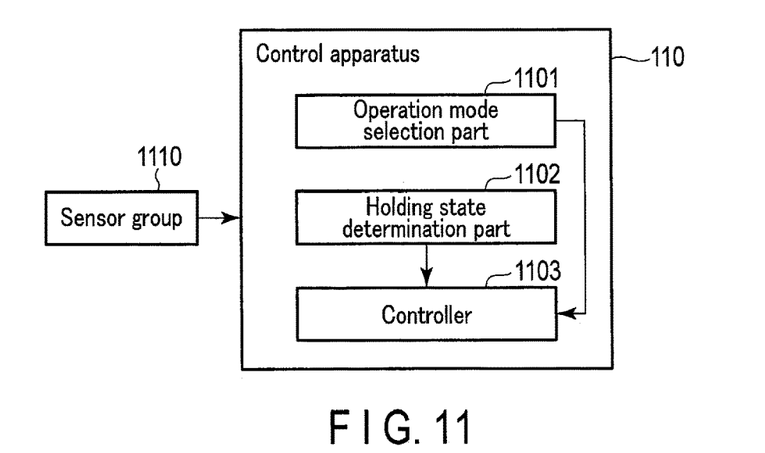
FIG. 11 is a block diagram illustrating an example of a structure of a control apparatus illustrated in FIG. 1.

FIG. 11 schematically illustrates an example of a structure of the control apparatus 110. As illustrated in FIG. 11, the control apparatus 110 controls the article handling apparatus 20 based on sensor data output from a sensor group 1110. The sensor group 1110 includes a plurality of sensors arranged in the ambient environment of articles. For example, the sensor group 1110 includes the ranging sensor 61 shown in FIG. 6, the depth camera 81 shown in FIG. 8A, and the depth camera 91 shown in FIG. 9. In the example of FIG. 11, the control apparatus 110 includes an operation mode selection part 1101, a holding state determination part 1102, and a controller 1103.

The operation mode selection part 1101 selects an operation mode used for holding a target article from among predetermined operation modes based on sensor data output from at least one sensor included in the sensor group 1110. The predetermined operation modes may include the upper surface suction mode, the side surface suction mode, and the scrape-out mode. In the embodiment in which the hand part 12 does not include the scraping-out part 19, the predetermined operation modes may include the upper surface suction mode and the side surface suction mode. A sensor such as the depth camera 81 shown in FIG. 8A or the depth camera 91 shown in FIG. 9 may be used.

The holding state determination part 1102 determines a holding state based on sensor data output from at least one sensor included in the sensor group 1110. The holding state may include at least one of the following: whether the holding part 13 is holding the article stably; whether the article held by the holding part 13 has an expected size; or whether another article has been moved in association with movement of the article held by the holding part 13. A sensor such as the ranging sensor 61 shown in FIG. 6, the depth camera 81 shown in FIG. 8A or the depth camera 91 shown in FIG. 9 may be used. The holding state determination part 1102 may include the above-described article upper surface movement detector and article side surface movement detector.

The controller 1103 controls the article handling apparatus 20 based on information output from the operation mode selection part 1101 and the holding state determination part 1102. For example, when the operation mode selection part 1101 selects the side surface suction mode, the controller 1103 supplies a control signal to the article handling apparatus 20 to drive the rotating part 14 to rotate the holding part 13 ninety degrees. When the holding state determination part 1102 detects that the holding part 13 is not holding the article stably, the controller 1103 supplies a control signal to the article handling apparatus 20 to drive the moving parts 15 and 16 and the arm part 11 to return the article.

Figure 12:
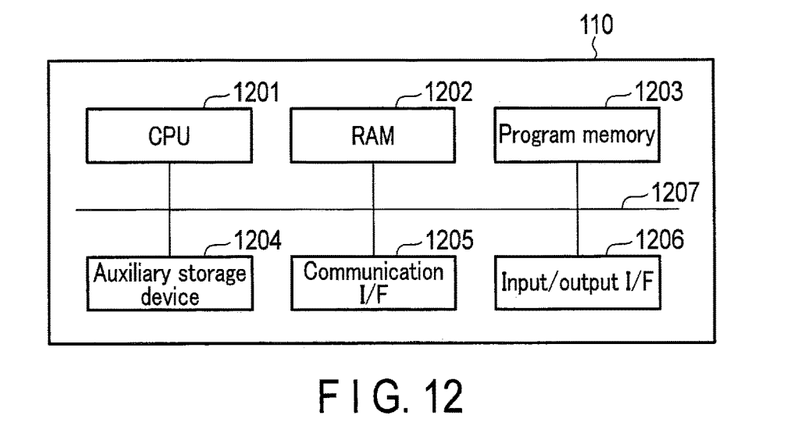
FIG. 12 is a block diagram illustrating an example of a hardware configuration of the control apparatus illustrated in FIG. 1.

FIG. 12 schematically illustrates a hardware configuration of the control apparatus 110. As illustrated in FIG. 12, the control apparatus 110 includes, as hardware, a central processing unit (CPU) 1201, a random access memory (RAM) 1202, a program memory 1203, an auxiliary storage device 1204, a communication interface 1205, an input/output interface 1206, and a bus 1207. The CPU 1201 communicates with the RAM 1202, the program memory 1203, the auxiliary storage device 1204, the communication interface 1205, and the input/output interface 1206, via the bus 1207.

The CPU 1201 is an example of a general-purpose processor. The RAM 1202 is used by the CPU 1201 as a working memory. The RAM 1202 includes a volatile memory such as a synchronous dynamic random access memory (SDRAM). The program memory 1203 stores various programs including an operation mode selection program and a holding state determination program. As the program memory 1203, for example, a read-only memory (ROM), the auxiliary storage device 1204, or a combination thereof is used. The auxiliary storage device 1204 stores data in a non-transitory manner. The auxiliary storage device 1204 includes a volatile memory such as a hard disc drive (HDD) or a solid state drive (SSD).

The communication interface 1205 is an interface for communicating with the article handling apparatus 20. The CPU 1201 transmits a control signal to the article handling apparatus 20 via the communication interface 1205. The communication interface 1205 may communicate with the article handling apparatus 20 by wire or wirelessly.

The input/output interface 1206 is an interface for connection with another device. The input/output interface 1206 receives sensor data from the sensor group 1110 shown in FIG. 11. To the input/output interface 1206, an input device such as a keyboard and/or an output device such as liquid crystal display may be connected.

Each program stored in the program memory 1203 includes computer-executable instructions. The program (computer-executable instructions), when executed by the CPU 1201, causes the CPU 1201 to perform a predetermined process. For example, the operation mode selection program, when executed by the CPU 1201, causes the CPU 1201 to perform a series of processes described with reference to the operation mode selection part 1101. The holding state determination program, when executed by the CPU 1201, causes the CPU 1201 to perform a series of processes described with reference to the holding state determination part 1102.

The program may be offered to the control apparatus 110 by, for example, being stored in a computer-readable storage medium. In this case, for example, the control apparatus 110 further includes a drive (not shown) that reads data from the storage medium, and acquires the program from the storage medium. Examples of the storage medium include a magnetic disk, optical disk (CD-ROM, CD-R, DVD-ROM, DVD-R, etc.), magnetooptical disk (MO, etc.), and a semiconductor memory. The program may be stored in a server on a communication network, and the control apparatus 110 may download the program from the server via use of the communication interface.

The processes described in the embodiment are not limited to those executed by a general-purpose hardware processor such as the CPU 1201, and may be executed by a dedicated hardware processor such as an application specific integrated circuit (ASIC). The term "processing circuitry" includes at least one general-purpose hardware processor, at least one dedicated hardware processor, or a combination of at least one general-purpose hardware and at least one dedicated hardware processor. In the example of FIG. 12, the CPU 1201, the RAM 1202 and the program memory 1203 correspond to the processing circuitry.

Figure 13:
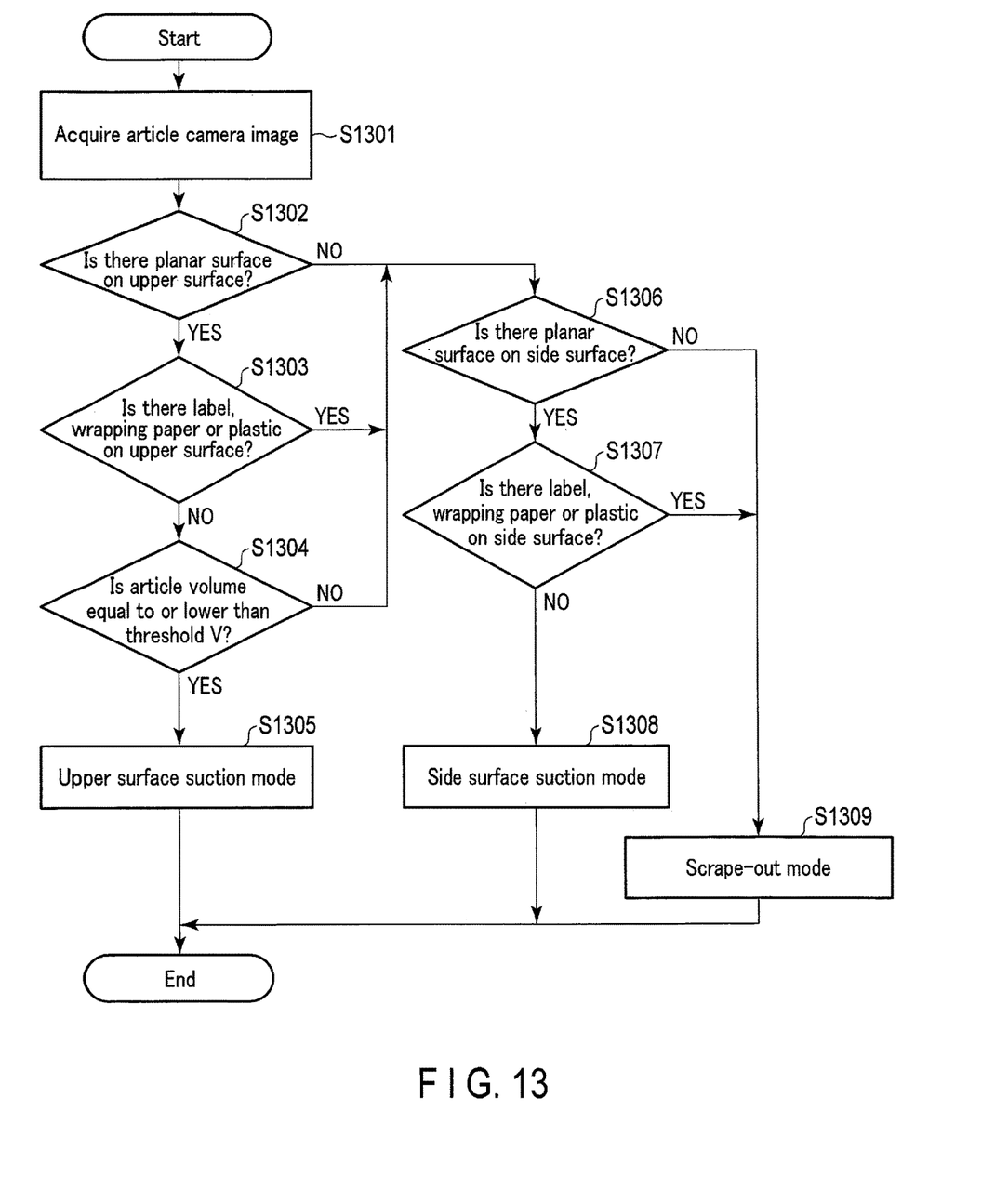
FIG. 13 is a flowchart illustrating an operation example of an operation mode selection process executed by the control apparatus illustrated in FIG. 11.

FIG. 13 schematically illustrates an operation example of the operation mode selection process. In step S1301 of FIG. 13, the operation mode selection part 1101 acquires an image of a holding-target article from a camera included in the sensor group 1110. In step S1302, the operation mode selection part 1101 determines whether there is a planar surface on the upper surface of the article based on the acquired image. If there is a planar surface on the upper surface of the article (step S1302; Yes), the process proceeds to step S1303.

In step S1303, the operation mode selection part 1101 determines whether there is a label, wrapping paper or plastic on the upper surface of the article. If there is no label, wrapping paper or plastic on the upper surface of the article (step S1303; No), the process proceeds to step S1304.

In step S1304, the operation mode selection part 1101 determines whether the article has a volume equal to or lower than a preset threshold V. If the volume of the article is equal to or lower than the threshold V (step S1304; Yes), the process proceeds to step S1305. In step S1305, the operation mode selection part 1101 determines selection of the upper surface suction mode.

On the other hand, if there is no planar surface on the upper surface of the article (step S1302; No), or there is a label, wrapping paper or plastic on the upper surface of the article (step S1303; Yes), or the volume of the article exceeds the threshold V (step S1304; No), the process proceeds to step S1306.

In step S1306, the operation mode selection part 1101 determines whether there is a planar surface on the side surface of the article. If there is a planar surface on the side surface of the article (step S1306 Yes), the process proceeds to step S1307.

In step S1307, the operation mode selection part 1101 determines whether there is a label, wrapping paper or plastic on the side surface of the article. If there is no label, wrapping paper or plastic on the side surface of the article (step S1307; No), the process proceeds to step S1308. In step S1308, the operation mode selection part 1101 determines selection of the side surface suction mode. If the volume of the article exceeds the threshold V, the operation mode selection part 1101 estimates that the article is heavy and may determine to use the supporting part 17 as illustrated in FIG. 3A.

On the other hand, if there is no planar surface on the side surface of the article (step S1306; No), or there is a label, wrapping paper or plastic on the side surface of the article (step S1307; Yes), the process proceeds to step S1309. In step S1309, the operation mode selection part 1101 determines selection of the scrape-out mode.

In this manner, the operation mode selection part 1101 detects the state of the holding target article based on the sensor data, and based on the detection result, selects the operation mode used for holding the article from among the upper surface suction mode, the side surface suction mode and the scrape-out mode.

Figure 14:
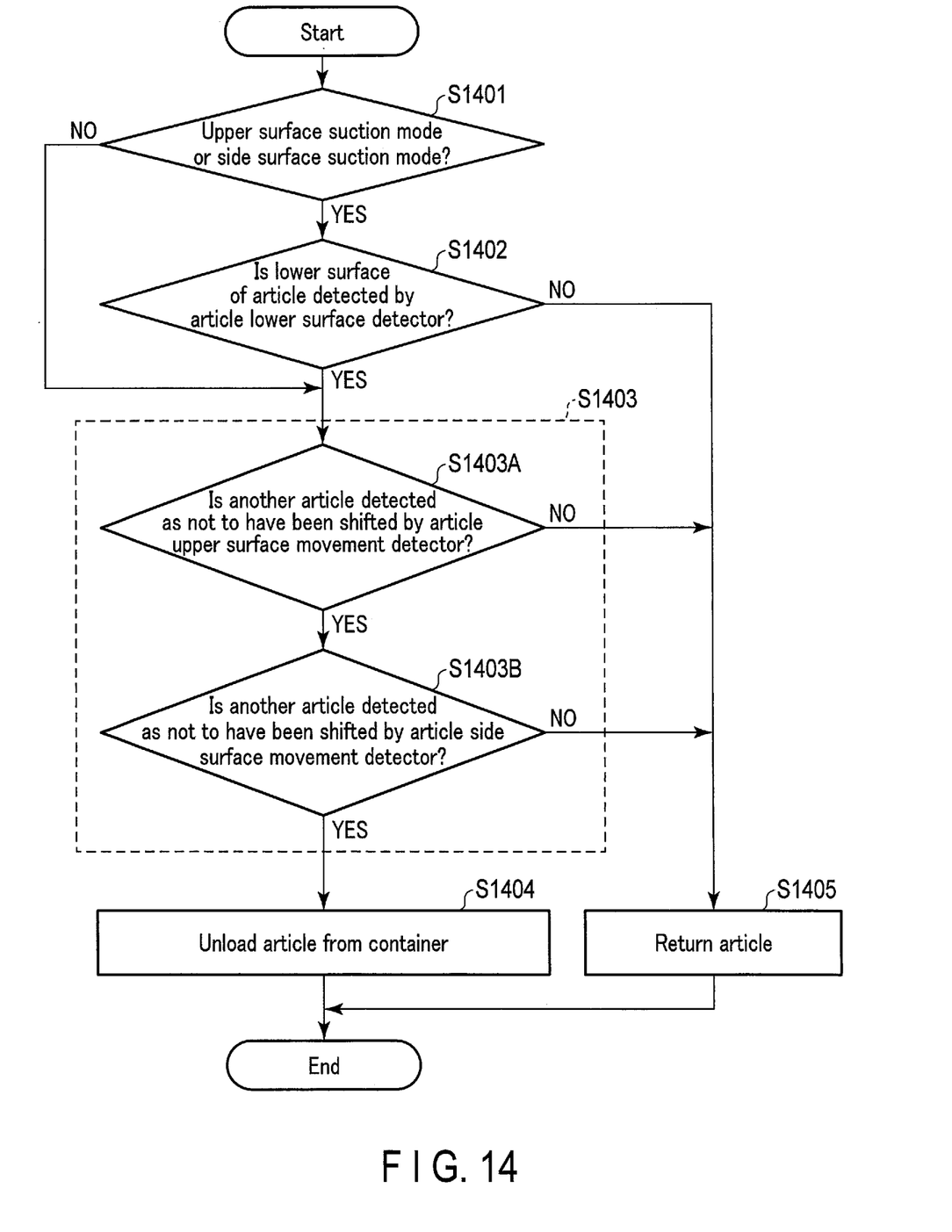
FIG. 14 is a flowchart illustrating an operation example of a holding state determination process executed by the control apparatus illustrated in FIG. 11.

FIG. 14 schematically illustrates an operation example of the holding state determination process. In step S1401 of FIG. 14, the holding state determination part 1102 determines whether the current operation mode is the upper surface suction mode or the side surface suction mode. If the current operation mode is the upper surface suction mode or the side surface suction mode (step S1401; Yes), the process proceeds to step S1402, whereas if the current operation mode is the scrape-out mode (step S1401; No), the process proceeds to step S1403.

In step S1402, the holding state determination part 1102 functions as the article lower surface detector, and determines whether the lower surface of the article has been detected as expected. For example, before the article handling apparatus 20 lifts up the article, the holding state determination part 1102 acquires an image including the article from the camera, and estimates a height of the article based on the image. If the lower surface of the article is detected when the article handling apparatus 20 lifts up the article to a lift level based on the height estimate value, the holding state determination part 1102 determines that the lower surface of the article has been detected as expected. Furthermore, if the lower surface of the article handling apparatus is not detected when the article handling apparatus 20 lifts up the article to a lift level based on the height estimate value, the holding state determination part 1102 determines that the lower surface of the article has not been detected as expected. If the lower surface of the article is detected as expected (step S1402; Yes), the process proceeds to step S1403. If the lower surface of the article is detected as expected, the holding state determination part 1102 may determine that the holding part 13 is holding the article in a stable manner.

In step S1403, the holding state determination part 1102 determines whether another article is shifted together with the article that is moved by the article handling apparatus 20. Specifically, in step S1403A, the holding state determination part 1102 functions as the article upper surface movement detector, and determines whether another article has been lifted up in association with lifting of the article, based on the output of the depth camera 81. In step S1403B, the holding state determination part 1102 functions as the article side surface movement detector, and determines whether another article has been moved laterally in association with lateral movement of the article, based on the output of the depth camera 91. If another article has not been shifted (step S1403A or S1403B; No), the process proceeds to step S1404.

In step S1404, the holding state determination part 1102 determines that movement of the article is continued. In response to the determination by the holding state determination part 1102, the controller 1103 drives the article handling apparatus 20 to unload the article from the container.

If the lower surface of the article is not detected as expected (step S1402; No), or if another article is shifted (step S1403A or S1403B; Yes), the process proceeds to step S1405. In step S1405, the holding state determination part 1102 determines that movement of the article is cancelled. This is for prevention of a collapse of the article stack. In response to the determination by the holding state determination part 1102, the controller 1103 drives the article handling apparatus 20 to return the article.

As described above, the hand part 12 includes the hand part 13 that suctions and holds the article, the rotating part 14 that rotates the holding part 13, the supporting part 17 that supports the article from below, the moving mechanism (moving parts 15 and 16) that moves the holding part 13 to the supporting part 17, and the scraping-out part 19 that scrapes out the article onto the supporting part 17. The article handling apparatus 20 provided with the hand part 12 supports multiple operation modes such as the upper surface suction mode, the side surface suction mode and the scrape-out mode, and holds and moves the article in an operation mode corresponding to the article state. Therefore, the article handling apparatus 20 can handle various types of articles. Moreover, detecting the holding state makes it possible to take out the articles when they are stacked randomly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A holding apparatus comprising:
a holding part configured to hold an article;
a rotating part connected to the holding part and configured to rotate the holding part;
a base part;
a supporting part fixed to the base part, the supporting part including a surface on which the article is to be placed; and a moving mechanism connected to the rotating part and the base part, the moving mechanism being configured to move the holding part and the rotating part in a first linear direction and in a second linear direction crossing the first linear direction with respect to the supporting part.

2. The holding apparatus according to claim 1, wherein the moving mechanism includes:
a first moving part configured to move the holding part and the base part in the first linear direction; and
a second moving part configured to move the holding part and the base part in the second linear direction.

3. The holding apparatus according to claim 2, wherein the rotating part is configured to rotate the holding part about a rotational axis, the rotational axis crossing the first linear direction and the second linear direction.

4. The holding apparatus according to claim 1, further comprising a scraping-out part provided in the holding part and configured to scrape out the article onto the surface of the supporting part.

5. An article handling apparatus comprising:
the holding apparatus according to claim 4; and
processing circuitry configured to select an operation mode used for taking out the article from predetermined operation modes based on sensor data output from a sensor provided in an ambient environment of the article, the predetermined operation modes including a first mode of holding an upper surface of the article by the holding part, a second mode of holding a side surface of the article by the holding part, and a third mode of scraping out the article onto the surface of the supporting part by the scraping-out part.

6. An article handling apparatus comprising:
the holding apparatus according to claim 1; and
processing circuitry configured to determine a holding state based on sensor data output from a sensor provided in an ambient environment of the article,
wherein the holding state includes at least one of following:
whether the holding part is holding the article;
whether the article held by the holding part has an expected size; or
whether another article has been moved in association with movement of the article held by the holding part.

7. The article handling apparatus according to claim 6, wherein the processing circuitry is further configured to detect a lower surface of an article lifted up using the holding part.

8. The article handling apparatus according to claim 7, wherein the processing circuitry is further configured to detect the lower surface of the article lifted up using the holding part based on sensor data output from a sensor arranged at the supporting part.

9. The article handling apparatus according to claim 6, wherein the processing circuitry is further configured to detect whether another article has been lifted up in association with the article lifted up using the holding part.

10. The article handling apparatus according to claim 6, wherein the processing circuitry is further configured to detect whether another article has been moved laterally in association with the article moved laterally using the holding part.

11. A control apparatus for an article handling apparatus including a holding part configured to hold an article, a rotating part that is connected to the holding part and that is configured to rotate the holding part, a base part, a supporting part that is fixed to the base part and that includes a surface on which the article is to be placed, a scraping-out part that is connected to the holding part and that is configured to scrape out the article onto the surface of the supporting part, and a moving mechanism that is connected to the rotating part and the base part and that is configured to move the holding part and the rotating part in a first linear direction and in a second linear direction crossing the first direction with respect to the supporting part and the base part, the control apparatus comprising:
processing circuitry configured to:
select an operation mode used for taking out the article from predetermined operation modes based on sensor data output from a sensor provided in an ambient environment of the article, the predetermined operation modes including a first mode of holding an upper surface of the article by the holding part, a second mode of holding a side surface of the article by the holding part, and a third mode of scraping out the article onto the supporting part by the scraping-out part, wherein the processing circuitry is configured to select the third mode when there is a label, wrapping paper, or plastic on an upper surface of the article and when there is a label, wrapping paper, or plastic on a side surface of the article; and
a controller configured to control the article handling apparatus in accordance with the selected operation mode.

12. A control apparatus for an article handling apparatus including a holding part configured to hold an article, a rotating part that is connected to the holding part and that is configured to rotate the holding part, a base part, a supporting part that is fixed to the base part and that includes a surface on which the article is to be placed, a scraping-out part that is connected to the holding part and that is configured to scrape out the article onto the surface of the supporting part, and a moving mechanism that is connected to the rotating part and the base part and that is configured to move the holding part and the rotating part in a first linear direction and in a second linear direction crossing the first direction with respect to the supporting part and the base part, the control apparatus comprising:
processing circuitry configured to:
determine a holding state based on sensor data output from a sensor provided in an ambient environment of the article; and
control the article handling apparatus according to a determination result of the holding state,
the holding state including at least one of following:
whether the article held by the holding part has an expected size; or
whether another article has been moved in association with movement of the article held by the holding part.

* * * * *